(12) United States Patent
Schwardt et al.

(10) Patent No.: US 8,763,785 B2
(45) Date of Patent: Jul. 1, 2014

(54) SYSTEM AND METHOD FOR UNLOADING TRAYS

(75) Inventors: Axel Schwardt, Schwabach (DE); Roland Fritzsche, Nuremberg (DE)

(73) Assignee: Dematic GmbH, Offenbach (DE)

( * ) Notice: Subject to any disclaimer, the term of this patent is extended or adjusted under 35 U.S.C. 154(b) by 494 days.

(21) Appl. No.: 13/127,149

(22) PCT Filed: Nov. 2, 2009

(86) PCT No.: PCT/EP2009/064473
§ 371 (c)(1),
(2), (4) Date: Aug. 9, 2011

(87) PCT Pub. No.: WO2010/060745
PCT Pub. Date: Jun. 3, 2010

(65) Prior Publication Data
US 2011/0308918 A1 Dec. 22, 2011

(30) Foreign Application Priority Data

Nov. 3, 2008 (DE) .......................... 10 2008 055 704

(51) Int. Cl.
*B65G 47/52* (2006.01)
*B65G 47/82* (2006.01)

(52) U.S. Cl.
USPC ............................. 198/597; 198/599; 198/610

(58) Field of Classification Search
None
See application file for complete search history.

(56) References Cited

U.S. PATENT DOCUMENTS

| 2,949,995 A | 8/1960 | Welch |
| 5,787,680 A * | 8/1998 | Tisma et al. ................... 53/244 |
| 7,047,710 B2 | 5/2006 | Winkler |

FOREIGN PATENT DOCUMENTS

| DE | 1963111 | 11/1970 |
| DE | 4023290 | 9/1991 |
| DE | 9211139 | 10/1992 |
| DE | 10313576 | 10/2004 |
| EP | 0001316 A1 | 4/1979 |
| EP | 0468288 | 9/1991 |
| EP | 0496992 A1 | 8/1992 |
| EP | 0583859 A1 * | 2/1994 |
| EP | 1462394 | 9/2004 |

OTHER PUBLICATIONS

International Search Report and Written Opinion of the International Searching Authority from corresponding Patent Cooperation Treaty (PCT) Application No. PCT/EP2009/064473, mailed Mar. 26, 2010.
International Preliminary Report on Patentability (IPER) for International Application No. PCT/EP2009/064473, which corresponds to the current application, dated Mar. 5, 2011.

* cited by examiner

*Primary Examiner* — Kavel Singh
(74) *Attorney, Agent, or Firm* — Gardner, Linn, Burkhart & Flory, LLP

(57) ABSTRACT

A system and method are provided for unloading trays loaded with articles using a first supply conveyor on which trays to be unloaded are delivered. The trays include a frame with a peripheral raised edge and a base having at least one aperture and a transport plate for the articles, the transport trays being positioned on the base of the frame. A lowering device is provided for lowering the frame of the tray, substantially without vertical movement of the transport plate.

24 Claims, 3 Drawing Sheets

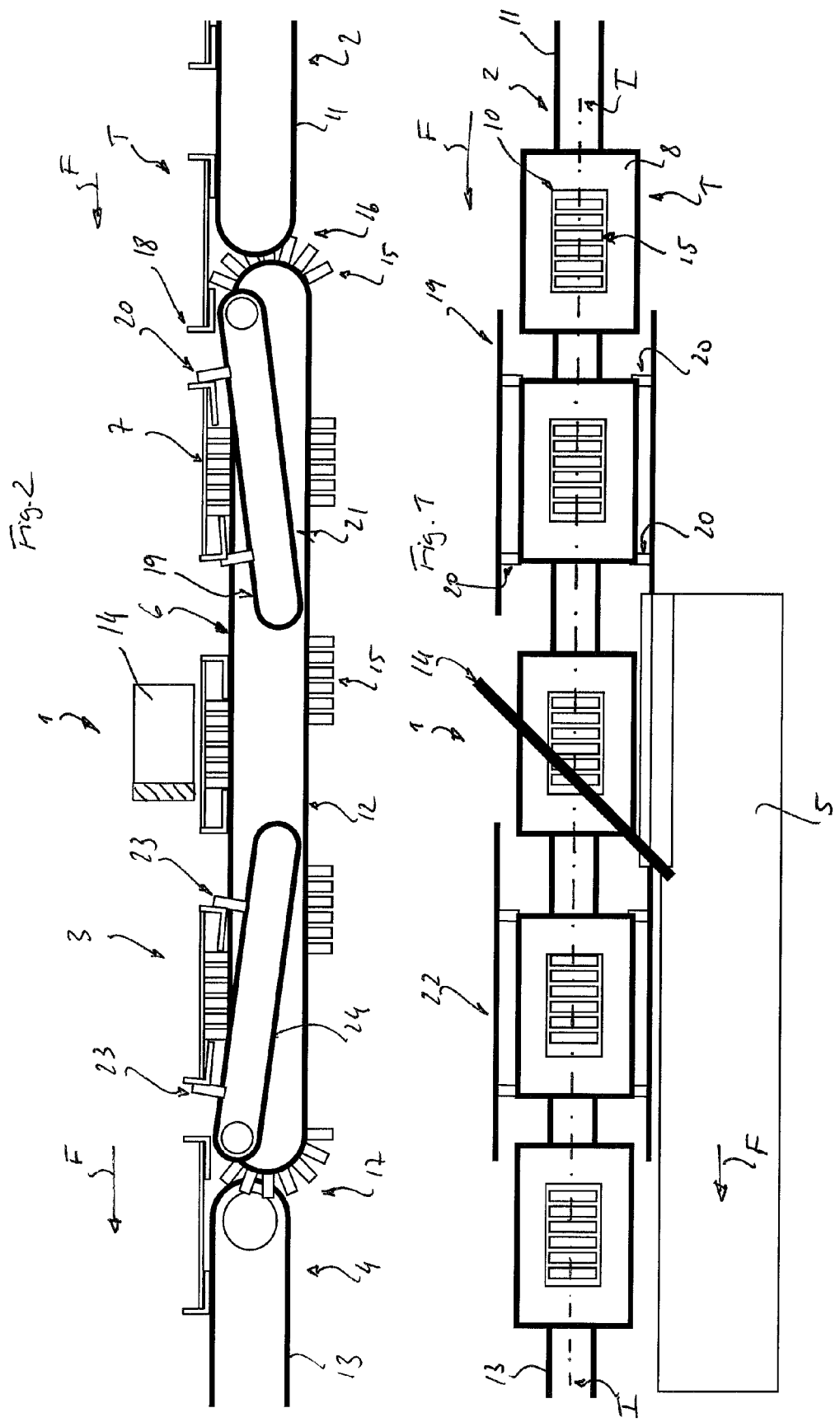

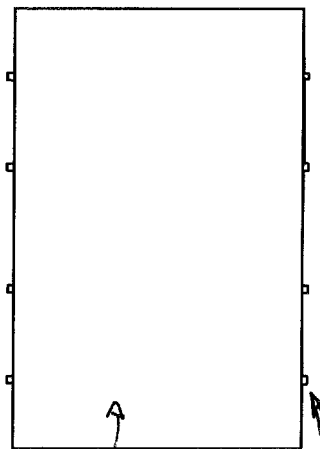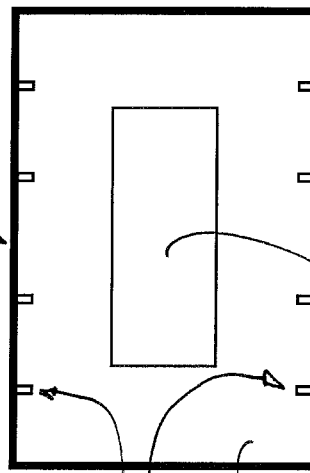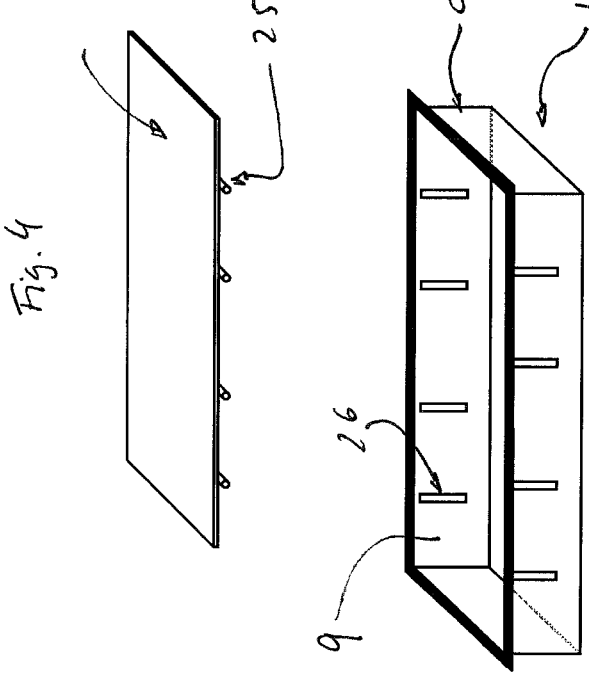

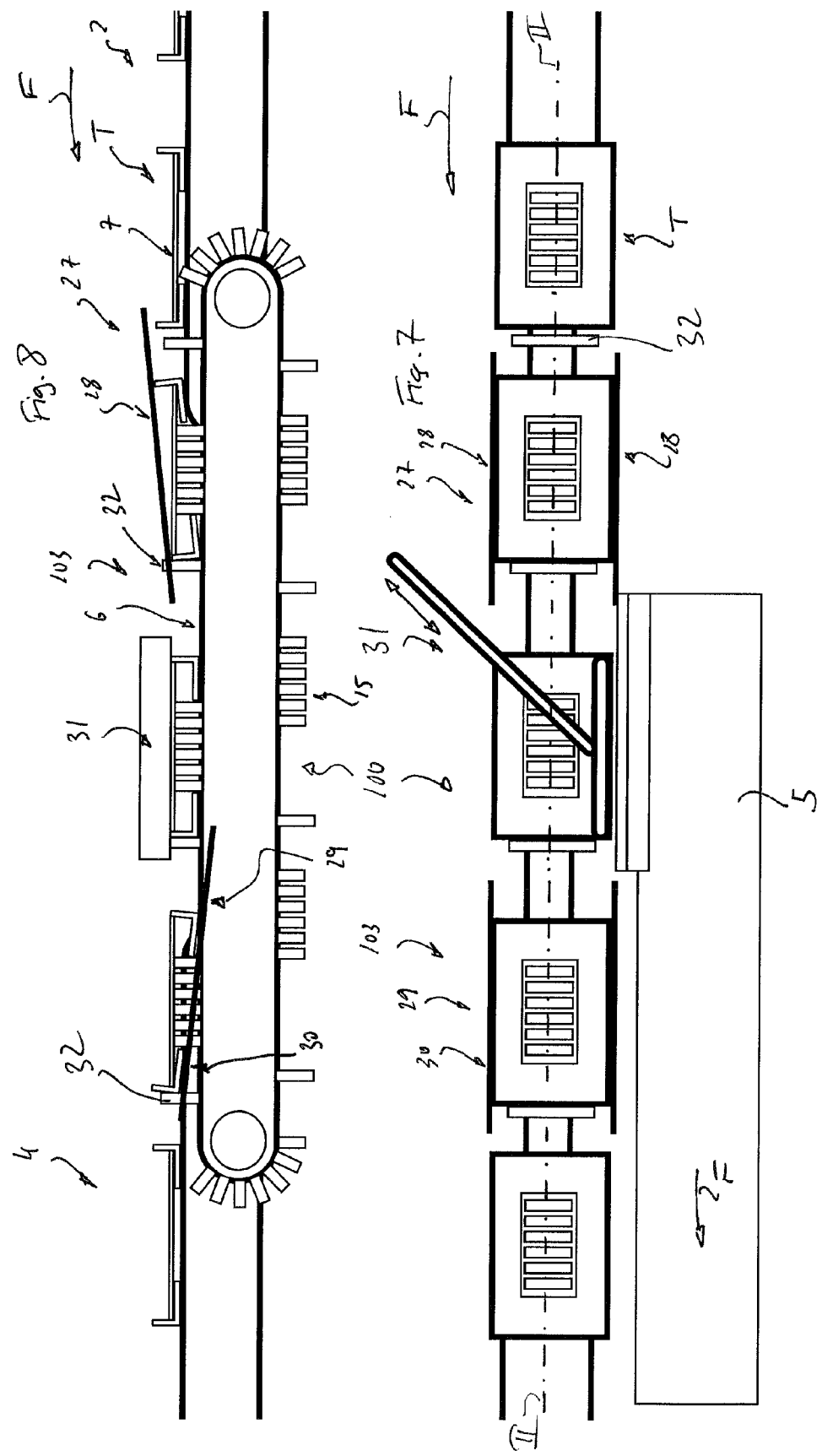

SYSTEM AND METHOD FOR UNLOADING TRAYS

BACKGROUND OF THE INVENTION

The invention relates to systems and methods for unloading trays loaded with articles, along a supply conveyor on which the trays to be unloaded are delivered.

Systems and methods of this type are used for automatic unloading of trays loaded with articles, wherein the unloading process is carried out during ongoing conveyor movement, incorporated into supply and discharge conveyor technology.

Trays are often used in automatic storage and picking systems. These trays allow articles, which are often highly dissimilar in their dimensions and/or material properties or which need to be transported and stored very gently, to be handled in logistics systems quickly and in a controlled and uniform manner in spite of this dissimilarity in the articles.

Commercially available trays have very different characteristics. For example, trays are known which have a closed base, or with bases which have slits or holes (for lifting the articles out) or even with inserted bases which can be lifted out in combination with slits and/or holes in the base.

In many cases, trays are loaded and unloaded manually. Applications are also known in which trays are both loaded and unloaded automatically.

While automatic loading is mostly carried out on the move, automatic unloading is typically carried out at specific stations, wherein the tray is stopped at these stations during unloading. This stoppage wastes valuable time, and special equipment (e.g., a device for lifting the articles out and pushing them away) is also generally required at these stations.

For instance, from DE 103 13 576 A1 it is known to use trays with a peripheral edge and with holes in the base so that the articles can be lifted out from below by lifting pins. The articles are then pushed by means of a rake (cf. para. [0013] and [0053]).

From DE 40 23 290 C1 it is known to lift roof tiles from their frame-like support for the purposes of engobing or glazing and then to set them down again, for which purposes a lifting member engaging from below through the support frame is provided, which lifts the roof tiles from the support frame and sets them down during constant conveyance, i.e. during movement.

However, this method can be used only when the movements of the roof tile conveyor and the rake conveyor are synchronised, since the lifting member must engage the support frame with its pins precisely through the openings in a perpendicular manner from below in order to lift the whole roof tile at the same time so that the lifting members are guided in a parallel manner. The lifting member must also be precisely adapted to the shape of the roof tiles in order to support them, meaning that the disclosed system is not very flexible. In addition, the speed is low since the lifting member must raise the roof tiles for a certain time so that they can be engobed or glazed.

The device shown therein is thus not suitable for modern logistics applications in which dissimilar articles need to be processed "simultaneously" at high speed and in a selective manner.

From the applicant's own DE 92 11 139 U1, in each case a system is known for unloading trays loaded with articles having a first supply conveyor on which the trays to be unloaded are delivered, which are provided with a peripheral raised edge and a base provided with apertures, and having lifting members of a lift-out device, which engage from below through the apertures and are designed to be moveable in the conveyor direction, a corresponding method also being known therefrom. On the base of the trays a flat transport plate possibly lying thereon is provided for the articles, which is raised by the lifting members so that the articles lying on the transport plate can be stripped off.

SUMMARY OF THE INVENTION

The present invention provides a method and a system for use in a modern logistics system, which permits unloading of trays at high speed without stopping and in so doing is flexible for different articles and is additionally simple in construction, without the articles having to undergo vertical movement on the trays in order to be unloaded, and which is additionally also suitable for heavy articles.

By providing a lowering device that only moves the constructionally light frame of a tray without effecting a vertical movement of the loaded transport plate lying on the inside, it is possible to move the articles lying on the transport plate separate from the frame through the system at a constant level. This permits a high processing rate with low noise propagation. Furthermore, heavy articles can now also be transported and unloaded reliably since they do not have to be moved vertically with only the frame of the tray securing the articles being lowered.

During unloading in accordance with an aspect of the invention, a plurality of movements take place in an overlapping manner: tray transport, support of the transport plate, lowering of the frame, stripping of the respective article and raising of the frame. This overlap means that time and space are saved, which also contributes to better throughput performances during tray unloading.

The described device may be more favourable from a cost point of view than the known unloading stations since no stop position is provided which would need to be monitored and is associated with additional noise propagation. In addition, neither a separate lift-out device nor a movable "pusher" (or the like) is required, which simplifies construction.

The described device therefore requires considerably less outlay in terms of sensors than the known unloading stations, since this device does not demand precise synchronicity.

The lowering device preferably includes support elements which reach through the aperture from below and move in the conveyor direction. Together with the lowering of the frame, these ensure a constant level for the transport plate.

In order to lower the frame of the tray in a simple manner, it may be advantageous—when the lowering device has a second conveyor adjoining the first supply conveyor—to lower the level thereof with respect to the supply conveyor.

The support elements are then expediently disposed on the movable conveyor part of the conveyor.

The support elements are then advantageously of a height such that the support surface of the transport plate protrudes over at least the height of the lowered peripheral edge of the frame of the tray and the difference in level with respect to the supply conveyor is cancelled out. The articles on the transport plate are then free of being protectively surrounded by the frame and can be stripped off.

In order to actively lower the frame of the tray, the lowering device can have a first grasping unit. The first grasping unit can have pressing blocks acting on the frame and pulling it downwards, which pressing blocks are disposed on a conveyor extending in an inclined manner downwards. The pressing blocks moving in the conveyor direction thus engage the frame and "pull" this downwards in a parallel manner in order to release the transport plate. At the same time the inclined conveyor supports the tray during the transfer from the supply conveyor to the conveyor. This permits a parallel relative movement between the tray frame and transport plate and prevents tilting of the transport plate in the frame, which may occur owing to rotation.

A second grasping unit can be correspondingly provided which is formed in an analogous or converse manner in order to raise the frame after unloading.

Optionally, in order to lower and also raise the frame, guides can be used, which act thereon and push it downwards, in the manner of slide-like positive guides. The guides can be disposed for this purpose in a lateral position and extending in an inclined manner downwards or upwards in the conveyor direction of the tray in order to come into contact only with the frame.

In accordance with another aspect of the invention, the lowering device can have a fixedly disposed stripper. This is disposed in an inclined manner with respect to the conveyor direction of the conveyor, in particular at an acute angle, preferably in the range between 15 and 45 degrees, and should have an extension which extends over the support surface of the tray. The stripper may be disposed above the conveyor only in such a way that the articles lying on the raised transport plate can be stripped off.

A pusher may optionally be used. The pusher would then also typically have a direction of movement of about 45 degrees. It is advantageous in this case that this pusher can be controlled with respect to the impact speed and corresponding force, which allows particularly gentle article handling and also does not change the orientation of the article. So-called "Vertibelts®"can also be considered as useful alternatives. These are fixedly disposed strippers which have a horizontally circulating, vertically oriented conveyor belt so that the articles are "actively"carried along and stripped off. In the case of small articles this is more reliable than using a device which is purely a stripper per se.

The articles can therefore be simply stripped from the transport plate during (further) conveyance of the tray, possibly without further moveable devices, by means of diversion. This preferably takes place approximately in the same plane.

In another aspect, a further transport conveyor for the removed articles is provided at the level of the stripper in parallel with the conveyor, the speed of which further transport conveyor may be adapted to the conveyor speed of the conveyor.

The conveyor may be a belt conveyor having a track width which permits the support elements to be disposed as raised areas on the belts. The support elements can then be formed as elongate raised areas on the conveyor, in particular as a raised part spanning the belts, the dimensions of which—at least in the upper thread-in region—are slightly smaller than those of the aperture.

When the support elements are formed as (elongate) raised areas on the conveyor, the dimensions of which are slightly smaller than those of the aperture, it is possible to carry out positive conveyance during transfer from the supply conveyor with non-positive conveyance, which allows articles to be stripped off at high speed without the tray slipping. For this purpose these support elements are usefully chamfered so that, when entering the tray opening (aperture), sufficient clearance is provided after the lowering action but there is a good fit between the tray and support elements. The thus positive tray transportation during stripping of the articles ensures a broad usage spectrum for the invention independently of the weight of the articles, friction values between articles and the support etc.

In another embodiment, the transport plate serving as a support is moveably connected to the frame of the tray and guided via pins or guides. Therefore the separate frame serves as a support frame of a basic body of the tray and the support serves as the actual transport support. By means of the pins or guides the transport plate is "geared" with the frame in such a way that this transport plate cannot be separated from the frame and plate without considerable deformation, but on the other hand its vertical position can be changed in parallel with the base of the frame.

In order to transport away the empty trays a conveyor for transporting away the empty trays can be provided as an extension of the conveyor and of the supply conveyor.

These and other objects, advantages and features of this invention will become apparent upon review of the following specification in conjunction with the drawings.

BRIEF DESCRIPTION OF THE DRAWINGS

FIG. 1 is a schematic top plan view of a system in accordance with the present invention, wherein the transport plates serving as a support are shown transparently for greater clarity;

FIG. 2 is a schematic side sectional view taken along line I-I in FIG. 1;

FIG. 3 is a top plan view of a support used within the framework of the invention;

FIG. 4 is a perspective view of the support of FIG. 3;

FIG. 5 is a top plan view of a frame of a tray used within the framework of the invention, shown without a transport plate;

FIG. 6 is a perspective view of the frame of FIG. 5;

FIG. 7 is a top plan view of another system in accordance with the present invention, wherein the transport plates are shown transparently for greater clarity, and FIG. 8 is a side sectional elevation taken along line II-II of FIG. 7.

DESCRIPTION OF THE PREFERRED EMBODIMENTS

In FIGS. 1 and 2 a first system is designated as a whole by reference numeral 1 and serves to unload trays T loaded with articles A.

System 1 includes a supply conveyor 2, on which trays T to be unloaded are delivered, which have a frame 18, which is provided with a peripheral raised edge 9 and with a base 8 provided with a central aperture 10 extending in the longitudinal direction, and have a comparatively thin flat transport plate 7 for the articles which lies on the base 8.

The system also includes a lowering device 3 with a conveyor 6, adjoining the supply conveyor 2, and an adjoining conveyor 4 for transporting away the emptied trays T.

A further transport conveyor 5 for the stripped-off articles A begins at the lowering device 3 or the conveyor 6 thereof and runs therefrom in parallel therewith, the speed of which further transport conveyor 5 is adapted to the conveyor speed of the conveyor 6.

In the illustrated embodiment, the supply conveyor 2 is a belt conveyor, the loaded trays T lying on the spaced-apart belts 11 thereof.

In the illustrated embodiment, the conveyor 6 is also a belt conveyor, the loaded trays T lying on the spaced-apart belts 12 thereof during unloading, the spacing or track width of which, however, is smaller so that the lift-out conveyor 6 can be geared with the supply conveyor 2 in order to achieve a transfer, e.g. at the transfer point 16.

The conveyor 4 for transporting away the trays is also a belt conveyor, the emptied trays T lying on the spaced-apart belts 13 thereof, the spacing or track width of which, however, is greater than that of the conveyor 6 and is approximately equal to that of the supply conveyor 2 so that the conveyor 6 can be geared with the conveyor 4 for transporting away the trays, in order to achieve a transfer e.g. at the transfer point 17.

The level of the conveyor 6 is lowered with respect to the supply conveyor 2 so that the upper edge of the tray frame 18 does not hinder the articles A from being pushed off when placed on the conveyor 6.

In addition to the conveyor 6, the lowering device 3 has support elements 15 which reach from below through the apertures 10 and are formed so as to move in the conveyor direction and which serve to support, and/or maintain the level of, the flat transport plate 7 for the articles, which lies on the base 8 of the trays, during lowering of the frame 18.

For this purpose, the support elements 15 are disposed on the moveable conveyor part 12 of the conveyor 6 or are formed as entrainment elements 15 which are made up of segments, are raised and are grouped in a block-like manner so that they can travel around in the diverting regions and can support the transport plate 7 from below at the same time as they reach into the aperture 10.

The support elements 15 are thus formed as elongate raised areas on the conveyor 6 as a raised bridging part of the belts 12, the dimensions of which are slightly smaller than those of the apertures 10.

The support elements 15 are of a height with such a dimension that the upper side surface of the transport plates 7 protrudes slightly at least over the height of the peripheral edge 9 of the tray T after lowering of the frame 18.

Therefore, a fixedly disposed stripper 14, also appertaining to the lowering device 3 and which is disposed in the region of the conveyor 6, can strip the articles A lying on the transport plates 7 after they are released by the lowering of the frame 18.

The stripper 14 is disposed at an acute angle inclined with respect to the conveyor direction (arrow in FIGS. 1 and 2) of the conveyor 6 and thus in such a way above the conveyor that the articles A lying on the transport plate 7 are stripped off and land on the parallel-running further transport conveyor 5.

For this purpose, the stripper has an extension which extends over the transport plate 7 of the trays T so that the articles A are reached independently of their position on the tray T or the transport plate 7.

The trays T are transported on the conveyor 2 by means of a non-positive arrangement. The transfer of the tray T from the supply conveyor 2 to the conveyor 6 of the lowering device 3 takes place at the transfer point 16.

At the point 16 the support elements 15 of a block mesh into the aperture 10 of the tray T. From this point the tray T is then transported by a positive arrangement between the tray T and the support elements 15.

At the same time the frame 18 of the tray T is grasped by a first grasping unit 19 and is lowered. For this purpose the grasping unit 19 has pressing blocks 20 which act on the frame 18 and pull it downwards, which pressing blocks are disposed in opposing positions on a conveyor 21 extending downwards in an inclined manner in the conveyor direction of the trays T, i.e. they grasp the frame 18 by clamping it between them.

By reason of the inclined extension of the conveyor 21 the frame 18 thus held is lowered, while the transport plate 7 resting on the support elements 15 stays at the same level.

The height of the support elements 15 is thus selected together with the arrangement of the conveyors 6 and 2 (cf. above) so that the transport plate 7 retains its level during complete engagement of the support elements 15 into the aperture 10 so that the upper edge of the transport plate 7 is located somewhat above the upper rim of the edge 9 of the tray.

The tray T, with the frame 18 completely lowered, now passes the fixedly disposed stripper 14.

The article or articles A on the transport plate 7 are pushed by the striper 14 from the tray T onto the parallel further transport conveyor 5 and the tray T passes the stripper.

The positive arrangement between the tray T and conveyor 6 is useful in order for stripping to take place.

After the article A has been pushed off the tray T the tray T comes to the transfer point 17.

At that location, in a second grasping unit 22, the reverse of the process for lowering the frame takes place, i.e. the frame 18 is lowered by corresponding pressing blocks 23 acting on the frame 18 and pulling it downwards, which frame blocks are disposed in opposing positions on a conveyor 24 extending in an inclined manner upwards in the conveyor direction of the trays T, i.e. they grasp the frame 18 between them in a clamping manner. Owing to the inclined extension of the conveyor 24, the frame 18 thus held is raised.

This point 17 is the transition from the conveyor 6 to the conveyor 5 for transporting the trays away. The two conveyors each have a different track width, analogous to the transfer point 16.

The transport plates 7 of the trays T are provided on their underside with laterally protruding pins 25 (cf. FIGS. 3 and 4) which engage in guides 26 correspondingly provided in the insides of the edge 9 of the frame 18 so that the transport plate 7 is "geared" with the frame 18 so that the transport plate 7 cannot be separated from the frame 18 without considerable deformation but on the other hand can change its vertical position in parallel with the base 8 of the frame 18. Therefore, the transport plate 7 cannot slip horizontally e.g. during stripping.

FIGS. 7 and 8 show a second system designated as a whole by reference numeral 100, which also serves to unload trays T loaded with articles A. It corresponds substantially to the system 1 described above, with the difference that the lowering device, designated in this case by reference numeral 103, is formed differently. Thus the same reference numerals as in the first embodiment are used for corresponding parts and only the differences will be discussed hereinunder.

The lowering device 103 has a first grasping unit 27 which has guides 28 which act on the frame 18 and push it downwards. The guides 28 are disposed laterally and extending in an inclined manner downwards in the conveyor direction F of the tray T in order to come into contact only with the frame 18.

The lowering device 103 also has a second grasping unit 29 which has guides 30 also acting on the frame 18 and pushing it downwards. The guides 30 are disposed laterally but extending in an inclined manner upwards in the conveyor direction F of the tray T in order to come into contact only with the frame 18.

The frame 18 is therefore lowered and raised by the lateral guides 28 and 30 respectively. The guides 28 and 30 are each formed in the manner of a positive guide or slide which laterally receives the frame 18 of the delivered tray T and guides or pushes it downwards or upwards by their inclined extension. The frame 18 thus slides in contact with the guides 28 and 30.

During this time the transport plate 7 is still supported by the support elements 15 so that it always retains its level in the system 100.

As a further difference, an actively moved pusher 31 is now used instead of the simple stripper 14 and is able to travel forwards and backwards at a 45 degree angle in the conveyor direction F (cf. double arrow) in order to strip or push off the articles A. It can additionally be controlled with respect to impact speed and force, which allows particularly gentle article handling and also does not change the orientation of the respective article A.

Furthermore, the conveyor 6 has stop elements 32 which precede the groups of support elements 15 in order to orient the position of the tray T. This is advantageous particularly in the case of heavy loads where positioning can be disrupted merely by the support elements 15 in the aperture 10.

The tray T thus moves from the supply conveyor 2 and, in the transfer region 16, contacts a corresponding stop element 32 so that the aperture 10 of the respective tray T or its frame 18 is oriented with the next group of support elements 15.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A system for unloading trays loaded with articles, said system comprising:
   a tray including a frame with a peripheral raised edge and a base having at least one aperture the tray further including a transport plate with a support surface for supporting articles, wherein the transport plate is positioned on the base of the frame;
   a first supply conveyor configured to deliver the tray in a conveyor direction for unloading; and
   a lowering device at the first supply conveyor, the lowering device configured to lower the frame of the tray substantially without vertical movement of the transport plate.

2. The system of claim 1, wherein the lowering device includes support elements which reach through the aperture of the base from below and move in the conveyor direction.

3. The system of claim 2, wherein the lowering device includes a second conveyor adjoining the first supply conveyor, wherein the level of the second conveyor is lower than the supply conveyor.

4. The system of claim 3, wherein the second conveyor includes a movable conveyor part and the support elements are disposed on the movable conveyor part of the second conveyor.

5. The system of claim 2, wherein the support elements are of a height such that the support surface of the transport plate protrudes over at least the height of the peripheral raised edge of the frame of the tray when the frame is lowered.

6. The system of claim 2, wherein the support elements are of a height such that the support surface of the transport plate is at a constant level throughout the system.

7. The system of claim 3, wherein the lowering device includes at least one chosen from (i) a fixedly disposed stripper, (ii) a moveable pusher, or (iii) a stripper which has a horizontally circulating and vertically oriented conveyor belt.

8. The system of claim 7, wherein the stripper or the pusher is disposed above the second conveyor in such a way that the articles lying on the transport plate are stripped off from the tray when the frame is lowered.

9. The system of claim 1, wherein the lowering device includes a first grasping unit that is configured to actively lower the frame of the tray.

10. The system of claim 9, wherein the lowering device includes a second grasping unit that is configured to actively raise the frame of the tray from a lowered position.

11. The system of claim 1, wherein the lowering device includes a first grasping unit having guides configured to act on the frame and press the frame downwards.

12. The system of claim 1, wherein the transport plate and the frame are connected to each other and guided in a vertically moveable manner.

13. A method for unloading trays loaded with articles, said method comprising:
   providing a first supply conveyor, a lowering device, and a tray including a frame with a peripheral raised edge and a base having at least one aperture, the tray further including a flat transport plate for supporting articles;
   positioning the transport plate on the base of the frame;
   lowering only the frame of the trays with the lowering device so that the transport plate remains on a constant level;,
   delivering the trays with the first supply conveyor; and
   unloading the transport plate of the tray after the frame is lowered.

14. The method of claim 13, further comprising:
   providing support elements of the lowering device;
   moving the support elements in the direction of the first conveyor; and
   supporting the transport plate with the support element from below the aperture to maintain the level of the transport plate.

15. The system of claim 1, wherein the lowering device includes a second conveyor adjoining the first supply conveyor, and wherein the level of the second conveyor is lower than the supply conveyor.

16. The system of claim 2, wherein the second conveyor includes a movable conveyor part and the support elements are disposed on the movable conveyor part of the second conveyor.

17. The system of claim 16, wherein the support elements are of a height such that the support surface of the transport plate protrudes over at least the height of the peripheral raised edge of the frame of the tray when the frame is lowered.

18. The system of claim 17, wherein the support elements are of a height such that the support surface of the transport plate is at a constant level throughout the system.

19. The system of claim 18, wherein the lowering device includes at least one chosen from (i) a fixedly disposed stripper, (ii) a moveable pusher, or (iii) a stripper which has a horizontally circulating and vertically oriented conveyor belt.

20. The system of claim 19, wherein the stripper or the pusher is disposed above the second conveyor in such a way that the articles lying on the transport plate are stripped off from the tray when the frame is lowered.

21. The system of claim 20, wherein the lowering device includes a first grasping unit that is configured to actively lower the frame of the tray.

22. The system of claim 21, wherein the lowering device includes a second grasping unit that is configured to actively raise the frame of the tray from a lowered position.

23. The system of claim 22, wherein the first grasping unit includes guides configured to act on the frame and press the frame downwards.

24. The system of claim 23, wherein the transport plate and the frame are connected to each other and guided in a vertically moveable manner.

* * * * *